United States Patent [19]

Galatha et al.

[11] 4,260,879
[45] Apr. 7, 1981

[54] UNIT RECORD READER

[75] Inventors: Matthew J. Galatha, Charlotte; Gene D. Rohrer, Concord; John J. Squires, Kannapolis, all of N.C.

[73] Assignee: International Business Machines Corporation, Armonk, N.Y.

[21] Appl. No.: 100,589

[22] Filed: Dec. 5, 1979

[51] Int. Cl.³ .................. G06K 7/08; G06K 13/00
[52] U.S. Cl. ................................. 235/449; 235/475
[58] Field of Search ............... 235/449, 450, 475, 483

[56] References Cited

U.S. PATENT DOCUMENTS

| 3,109,924 | 11/1963 | Frederick | 235/475 |
|---|---|---|---|
| 3,218,440 | 11/1965 | Albosta | 235/449 |
| 3,646,323 | 2/1972 | Young et al. | 235/475 |
| 3,801,804 | 4/1974 | Von Glahn et al. | 235/475 |
| 3,818,446 | 6/1974 | Benson | 235/475 |
| 4,112,470 | 9/1978 | Yamauchi | 235/475 |
| 4,181,920 | 1/1980 | Cerekas | 235/475 |

OTHER PUBLICATIONS

Excerpt from Manual Relating to IBM Product "1419", form 225-6575-4, pp. 2-5, 2-6.
Excerpt from Manual Relating to IBM Product "1255", SY24-3555-2, pp. 3-10, 3-11.
Excerpt from IBM Service Publication PN 4134052, PN 4134320, PN 4134321, PN 4134322, Relating to IBM Product "3890".

Primary Examiner—Daryl W. Cook
Attorney, Agent, or Firm—E. Ronald Coffman

[57] ABSTRACT

A power driven belt provides back-up pressure for a check or similar document bearing magnetic information as the document moves past a reading transducer. The belt is resiliently urged against cylindrical bearing surfaces adjacent the transducer to provide a non-critical geometry.

7 Claims, 3 Drawing Figures

UNIT RECORD READER

Automatic reading devices such as those used to read stylized magnetic images from bank checks are required to rapidly and reliably transport the documents past a transducer. This invention provides a power driven document backup belt which presents the documents serially to the transducer to meet these needs. In addition, the configuration of the backup belt makes its adjustment relatively non-critical, thereby enabling it to be replaced when necessary by relatively unskilled personnel.

Bank checks typically include a row of highly stylized characters, positioned along the lower margin, which are magnetizable for automatic reading to expedite the accounting and distribution of the checks and the transactions they represent. The automatic equipment passes the magnetized characters over a transducer which generates a pattern of electrical signals which in turn is analyzed by a recognition process to determine, for example, the destination of the check and automatically control a sorter associated with the equipment to physically sort the check according to its destination. There are a number of factors which can interfere with the accurate reproduction of the desired pattern of electrical signals from a check, including the printing of the stylized character, the presence of folds, wrinkles or tears in the check, and the stable uniform condition of the check transport and support equipment itself. Where the recognition process is unable to fully recognize the information contained on the check, the check is sorted into a reject bin. These "reject" checks must then be read by bank personnel and processed manually. Obviously, it is desirable to keep the percentage of rejected checks to a minimum.

Many of the rejects can be attributed to the physical behavior of the check itself as it moves past the transducer. Ideally, a check would move past the transducer at a uniform speed in continuous contact with the transducer and with a constant pressure thereagainst. Distortions of the check, checks of differing thickness, and progressive wear of the transducer and adjacent parts, produce deviations from this ideal. As processing speed increases, inertial and resonance factors, resulting from intermittent loads imposed by the passage of successive checks, cause an increasingly significant deviation from the ideal condition.

There presently exists successful high-speed automatic check reading equipment which employs a power driven, rotating brush to provide a supporting pressure against the back of the check to hold the check against the surface of the transducer as the check is transported therepast. One characteristic of such a brush device is that it has a relatively critical spacial relationship to the transducer, requiring a highly trained person to adjust and replace it. Soft rubber rollers are also employed as backup devices in mechanism of this type; however, such rollers tend also to have critical adjustments and, in addition, produce increased progressive wear of the transducer.

It has thus been an object of our invention to provide a backup support for receiving and supporting cut documents in a reliable and efficient manner as they pass a transducer. Another object of this invention has been to provide a document backup device, having an inherently low maintenance requirement, both as to the maintenance required and the level of skill required to perform such maintenance.

These objects are achieved by our invention by defining a curved path for the checks, such that the characters to be read travel along a concave path. The transducer is positioned adjacent this path and mounted within a smoothly defined pressure bearing surface which extends along the path both before and after the transducer. A flexible pressure belt is wrapped against the curved bearing surface and is tracked around rollers by which it is guided, tensioned and driven. The checks to be read pass between the pressure belt and the transducer and are thus supported throughout a relatively large arc of travel through the curved path. The geometry of this arrangement is inherently insensitive to variations in thickness and smoothness of the checks. In addition, it tends to be relatively insensitive to dimensional changes due to wear. Furthermore, by providing a separate power drive to the belt, impact loading as the check encounters the belt, is reduced or eliminated. We prefer, in fact, to drive the belt at a speed that is in excess of the speed of the check travel.

These and other objects, features and advantages of our invention will be apparent from the following more specific description of a preferred embodiment of our invention wherein reference is made to the accompanying drawings, of which:

FIG. 3 is an enlarged plan view of a portion of the reader shown in FIG. 2, showing details immediately adjacent the read head.

Figure 1:
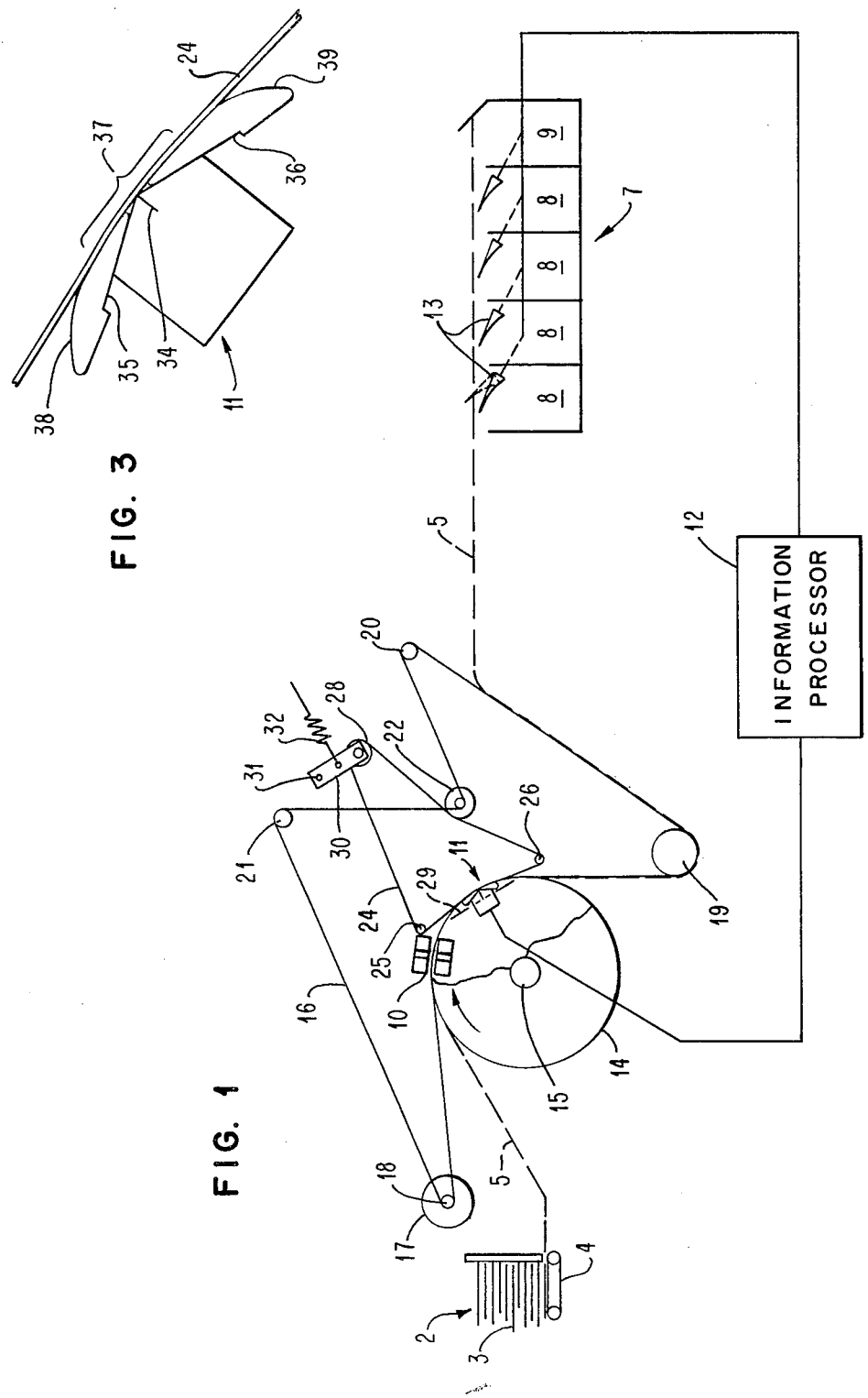
FIG. 1 is a schematic view of check processing system constructed in accordance with our invention.

FIG. 1 schematically shows a check processing system 1 in which the record reader of our invention can be employed to advantage. The system 1 includes a check supply hopper 2, containing a stack of checks or similar documents 3 which are fed seriatum by picker device 4 into a processing path 5. Feed means not shown, conduct the checks 3 along path 5 to a record reader 6 and thence to a sorter 7, having a plurality of bins 8 and a reject bin 9. As the checks pass through reader 6, their magnetic ink characters are magnetized by a magnetizer 10 and the thus magnetized characters are subsequently presented to a magnetic/electric transducer or read head 11 which develops a pattern of electrical signals therefrom and transmits those signals to information processor 12 by which the information content of electrical signals is determined. Information processor 12 controls individual gates 13 of the sorter 7 according to the information read from individual checks to cause each of the checks to be delivered to a particular bin 8 in accordance with such information. Where information processor 12 is unable to interpret the electrical signals presented to it, which have been derived from a particular check, that check will be delivered to the reject bin 9, and will require hand processing by bank personnel. In addition, information correctly read from the checks is utilized in information processor 12 to record and carry out the financial transactions represented by the check. It is to be understood that other processing stations may be arranged along path 5 but are not shown herein as they are not related to the record reader of this invention.

Figure 2:
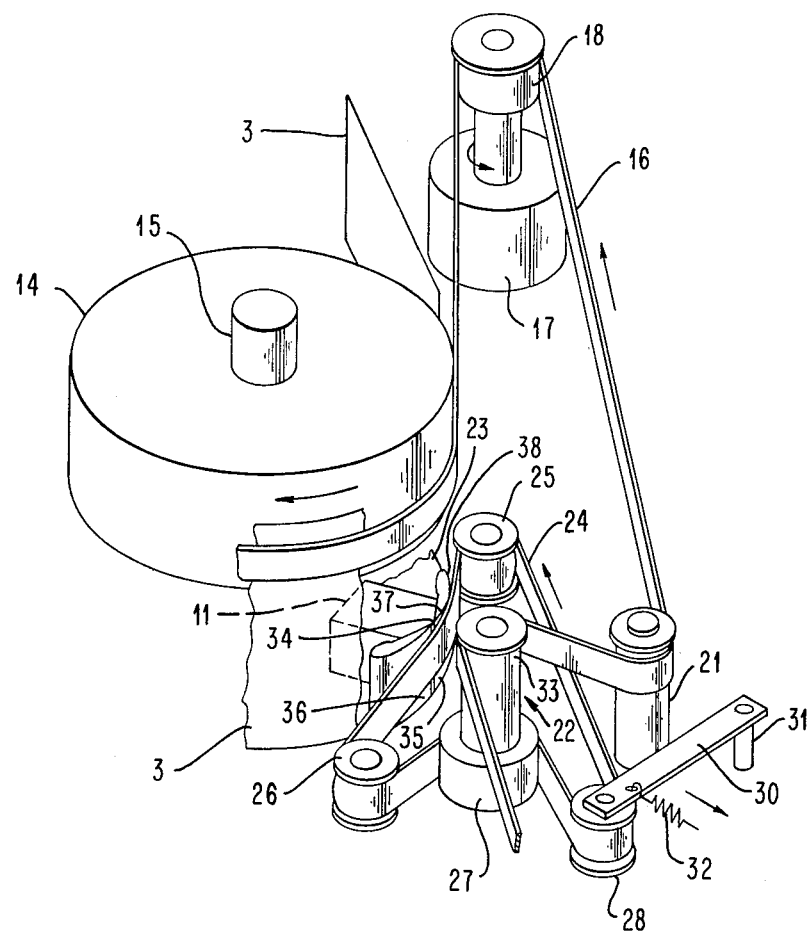
FIG. 2 is a partial perspective view of the reader portion of the system of FIG. 1.

The details of record reader 6 and the related transport mechanism are shown in FIG. 1 and in greater detail in FIGS. 2 and 3. The record reader 6 includes a transport drum 14 which is driven clockwise about its axial shaft 15 by a belt 16. Belt 16, in turn, is driven by motor or power source 17, having a capstan 18, and is trcked around idler rolls 19, 20 and 21, as well as a power take-off or pressure belt drive roller 22. Motor 17 drives belt 16 and, in turn, drum 14 at a speed that substantially matches the speed of checks 3 as they otherwise approach the record reader 6 on path 5. A span of belt 16 between capstan 18 and idler 19 is wrapped around the cylindrical periphery of the transport drum 14 and causes the upper portion of checks approaching along path 5 to be captured against the transport drum 14 and to move through a curved path conforming to the curvature of drum 14.

Below the drum 14 is a support structure 23 (see FIG. 2) in which the magnetizer 10 (FIG. 1) and transducer 11 are supported. Our invention provides a belt 24 to engage the rear side of the checks 3 immediately opposite to the transducer 11 to provide reliable presentation of the magnetic ink characters to the transducer 11. Belt 24 is tracked around a pair of pressure span idlers 25 and 26, past a capstan portion 27 of the power take-off roller 22 and around a movable tension adjustment idler or guide 28. The idlers preferably have crowned guiding surfaces to provide accurate tracking of the belt 24. Idler 28 is mounted on an arm 30 that is pivoted at 31 and is continuously urged outwardly by a heavy spring 32 to exert tension on belt 24. The large diameter of capstan portion 27 of roller 22 with respect to the driven upper portion 33 thereof causes belt 25 to travel faster than belt 16 and the checks 3 which it transports on the drum 14.

The magnetic transducer 11 can be of any suitable construction and is shown simply schematically with a sensing gap 34.

As is best shown in FIG. 3 immediately adjacent and to either side of the sensing gap 34 of transducer 11 are a pair of bearing surface plates which we refer to as a lead-in shim 35 and a lead-out shim 36. These bearing plates are made of a non-magnetic material and provide a hard, smooth surface against which the checks 3 are pressed by the backup belt 24. Each of the shims 35 and 36 include a cylindrical surface in the region 37 adjacent gap 34 which closely matches the curvature and location of a projection of the cylindrical surface of drum 14 so that the checks 3 are not distorted by the transport mechanism during reading. The shims 35 and 36 also include lead-in and lead-out regions 38 and 39 respectively, which are displaced inwardly from the cylindrical surface region 37 toward the center of curvature thereof. Support structure 23 (FIG. 2) positions transducer 11 and the shims 35 and 36 with respect to idlers 25 and 26, such that a relatively large span of the belt 24 is deformed against the shims 35 and 36 while leaving lead-in and lead-out clearance to facilitate transition with the leading and trailing edges of the checks. For example, lead-in region 38 assists in smoothly capturing curled or folded corners.

In OPERATION, checks 3 are delivered to the record reader 6 along path 5 at a relatively high speed, e.g., 150 inches per second. As each check approaches the drum 14, its upper portion becomes trapped between belt 16 and drum 14 and the check is caused to wrap about drum 14, thereby assuming its curvature. As the lower portion of the check passes through magnetizer 10, a strong field created by a pair of opposed magnets magnetizes the magnetic ink characters along the lower margin of the check. Continued motion of the check 3 brings the lead edge of its lower portion into the lead-in region between belt 24 and portion 38 of lead-in shim 35. The check leading edge next comes in contact with belt 24 which yields outwardly to accommodate the check thickness but with a minimum of shock or disruption due to the relatively large curvature of the belt span and the overspeed of the belt. i.e. 225 inches per second. The continued movement of the check brings the lower portion, bearing the magnetized magnetic ink characters, smoothly past the read gap 34 of transducer 11 while exerting a widely spread, uniform, and relatively transient-free pressure against the reverse side of the check. During this motion, wrinkles or creases in the check will tend to be removed by the ironing action of the overspeeding belt 24. Preferably the belt 24 is formed of a woven cloth such as cotton or polyester fiber which is impregnated with an elastomer binder and formed to exhibit a nubby, fabric-rich outer surface that engages the back of the checks 3 with a low coefficient of friction to minimize check wear, particularly near the trailing edge.

Much of the improved reliability of our backup belt construction is derived not only from the improved form of applying and maintaining pressure as thus described above, but also in the ability of the mechanism to maintain relatively uniform performance over an extended period of time. This is achieved in the first instance by the relatively large curvature of the pressure-applying span of belt 24 by which small changes in radius of curvature produce relatively insignificant pressure differences. Such changes can result from checks of different thickness being received between belt 24 and shims 35 and 36, and can also result from wear of the shims 35 and 36 or of the belt 24. The belt wear itself is reduced by being spread over the relatively large surface area that the belt provides. Furthermore, should the belt 24 break or otherwise become unusable, it is a simple matter for an untrained operator to install a new belt simply by placing the new belt around idlers 25 and 26, displacing pivoted idler 28 against its spring and loading belt 24 onto idler 28. Since idlers 25 and 26 are located precisely with respect to transducer 11, the belt 24 will automatically assume a properly adjusted configuration.

Having thus described our invention, what we claim as new, and desire to secure by Letters Patent is:

1. Apparatus for reading indicia from a series of documents, including transport means for moving the documents seriatum through a curved path having a concave side, reading means positioned on the concave side of said path for engaging documents moved therepast, and bearing surface means positioned along said path immediately before and after said reading means wherein the improvement comprises:

tracking means, including guide surfaces, positioned on either side of said reading means and defining therebetween a straight line that intersects said path, an endless belt tensioned about said tracking means, and held by said guide surfaces against said bearing surface means, and means driving said belt for movement over bearing surface means in the direction of document motion along said path.

2. Apparatus for reading indicia as defined in claim 1 wherein said transport means moves the documents at a first speed and wherein the improvement further comprises:

said belt driving means moving said belt at a speed in excess of said first speed.

3. Apparatus for reading indicia as defined in claim 1 wherein said transport means comprises a cylindrical drum and a transport belt tracked against the outer surface thereof for engaging an upper portion of said document to move the document through a curved path that is substantially defined by the cylindrical periphery of said drum, and wherein the improvement further comprises:

said bearing surface means comprising cylindrical surface portions, positioned immediately adjacent said reading means and lying substantially on a projection of said transport drum cylindrical periphery.

4. Apparatus for reading indicia as defined in claim 3, wherein the improvement further comprises:

a lead-in surface portion on that bearing surface means positioned immediately before said reading means, said lead-in surface portion being displaced inwardly of said cylindrical portion toward the center of curvature thereof, to more readily receive the leading edge of a document presented by said transport means.

5. Apparatus for reading indicia as defined in claim 1, wherein said reading means comprises:

a magnetic/electric transducer.

6. Apparatus for reading indicia as defined in claim 1, wherein the improvement further comprises:

said tracking means further including a movable guide member, and resilient means continuously urging said movable guide member in a direction to exert tension on said belt.

7. Apparatus for reading indicia as defined in claim 1, wherein the improvement further comprises:

said belt driving means, including roller means engaging said belt, and transmission means for receiving motion from said transport means for driving said roller means.

* * * * *